United States Patent
Komljenovic et al.

(10) Patent No.: US 12,247,835 B2
(45) Date of Patent: Mar. 11, 2025

(54) STABILIZED FREQUENCY GENERATOR

(71) Applicants: Tin Komljenovic, Goleta, CA (US); Minh Tran, Goleta, CA (US)

(72) Inventors: Tin Komljenovic, Goleta, CA (US); Minh Tran, Goleta, CA (US)

(73) Assignee: Nexus Photonics Inc, Goleta, CA (US)

( * ) Notice: Subject to any disclaimer, the term of this patent is extended or adjusted under 35 U.S.C. 154(b) by 224 days.

(21) Appl. No.: 17/676,422

(22) Filed: Feb. 21, 2022

(65) Prior Publication Data

US 2022/0299309 A1    Sep. 22, 2022

Related U.S. Application Data

(60) Provisional application No. 63/164,300, filed on Mar. 22, 2021.

(51) Int. Cl.
    *G01B 9/02001*    (2022.01)
    *G02B 6/293*    (2006.01)

(52) U.S. Cl.
    CPC ..... *G01B 9/02001* (2013.01); *G02B 6/29352* (2013.01)

(58) Field of Classification Search
    CPC ........... G01B 9/02001; G02B 6/29352; G02B 6/12004; G02B 6/102; G02B 6/4296; G02B 2006/12147; G02B 2006/1215; G02B 2006/12159
See application file for complete search history.

(56) References Cited

U.S. PATENT DOCUMENTS

| | | | |
|---|---|---|---|
| 9,634,763 B2 | 4/2017 | Szafraniec | |
| 9,673,900 B2 | 6/2017 | Szafraniec | |
| 10,890,822 B2 * | 1/2021 | Kawaai | G02F 1/225 |
| 11,664,898 B2 * | 5/2023 | Maleki | G02B 6/29341 |
| | | | 398/202 |

FOREIGN PATENT DOCUMENTS

WO    WO-2005081431 A1 *  9/2005    ....... H04B 10/25751

* cited by examiner

*Primary Examiner* — Seung C Sohn
(74) *Attorney, Agent, or Firm* — Shalini Venkatesh (57) ABSTRACT

A radio frequency generator has first and second lasers configured to emit first and second optical outputs; a reference module configured to receive at least part of the first and second optical outputs from the first and second lasers; a control module connected to the first and second lasers and to the reference module; and an optical-to-electrical (O/E) converter configured to process optical signals, originating from the first and second single-frequency lasers, to provide a radio frequency output.

Another radio frequency generator has a control module; and a reference module connected to the control module. The reference module includes a photonic integrated circuit (PIC) having first and second single-frequency lasers configured to emit first and second optical outputs; an unbalanced Mach-Zehnder interferometer (UMZI) with first and second 3×3 optical splitter/combiners; first and second peripheral splitter/combiners; and an output splitter/combiner.

13 Claims, 7 Drawing Sheets

STABILIZED FREQUENCY GENERATOR

This invention was made with US Government support under NASA STIR 2018-II 80NSSC20C0034. The Government has certain rights in this invention.

FIELD OF THE INVENTION

The present invention relates to radio frequency signal generation. More specifically, certain embodiments of the invention relate to an apparatus for realization of photonic integrated circuit (PIC) based radio frequency signal generators utilizing optical sources with improved performance.

BACKGROUND OF THE INVENTION

The radio frequency (RF) spectrum is divided into multiple bands with conventional names as defined by International Telecommunications Union (ITU), two examples being low-frequency (LF) covering 30-300 kHz, and very-high frequency (VHF) covering 30-300 MHz. Frequencies of 1 GHz and above are conventionally called microwave, while frequencies of 30 GHz and above are designated millimeter wave. Frequencies above 300 GHz and up to 3000 GHz (3 THz) are called terahertz (THz), although the upper boundary is somewhat arbitrary and is considered by some to be as high as 30 THz.

Historically, particular bands were reserved for particular application such as e.g. radio, television, cell phone networks, wireless networks, etc. With the increase in popularity of such services and applications, there is a need to facilitate the use of higher and higher frequencies to enable service to larger number of users, an example being wireless networks starting at 900 MHz and 2.4 GHz and expanding to higher and higher frequencies such as 3.6 GHz, 4.9 GHz, 5 GHz, 5.9 GHz and 60 GHz to enable more bandwidth and more active users. There is a growing need to push such systems to use even higher frequencies, at the higher end of the millimeter wave band and into the terahertz region. Other reasons for using terahertz frequencies could be medical imaging (terahertz radiation is non-ionizing radiation and its low photon energies in general do not damage living tissues and DNA), security (terahertz radiation can penetrate fabrics and plastics), and others.

Terahertz radiation, occupying the middle ground between microwaves and infrared light (starting around 3 THz to 30 THz), is also known as the "terahertz gap", where technology for its generation and manipulation is more challenging. The generation and modulation of electromagnetic waves in this frequency range by conventional electronic devices used to generate radio waves and microwaves is very hard, requiring the development of new devices and techniques, while generation using lasers or other types of optical sources used for even higher frequencies all the way into the visible region is also challenging in and around THz range.

There are several ways of generating terahertz radiation including gyrotron, Schottky diode multipliers, varactor (varicap) multipliers, quantum cascade lasers, the free electron laser, pulsed sources and photo-mixing sources, among others. Photo-mixing is the generation of continuous wave terahertz radiation with the use of two lasers. The beams are mixed and focused onto a photo-mixer device, which then generates the terahertz radiation. At lower frequencies (in ~100 GHz range), high-speed photodetectors can also be used to generate signals from two lasers.

The advantages of photo-mixing are that it is continuously tunable over the frequency range corresponding to the tunable range of the lasers that are mixed, and that it generates continuous wave signals. The frequency of the generated signal is defined by frequency difference between the two lasers, so precise control of generated signal directly depends on the stability of those lasers. The challenging requirements on laser stability are generally met by using larger photo-mixing systems that require complex packages to precisely control laser temperature, drive current and other relevant parameters impacting the laser frequency. Nevertheless, even state-of-the-art systems only exhibit frequency accuracy in the range of GHz, and frequency control in the range of MHz.

There is a clear need to improve performance and to reduce size, weight, and cost (SWaP-C) of such systems for wide deployment in next generation of communication and sensing systems. The present invention enables orders of magnitude SWaP-C improvement using a photonic integrated circuit (PIC) based reference to control and monitor the frequency difference of the lasers generating the continuous wave signal, without a need for bulky packaging schemes.

DETAILED DESCRIPTION

Described herein are embodiments of a system and associated methods for realization of frequency generators using photonic integrated circuits with improved performance and additional functionality relative to prior art generators.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

For the purposes of the present disclosure, the term "substantially" applied to numerical values of parameters is intended to encompass deviations from those values caused by fabrication or assembly imperfections, to be expected in practice. For example, in referring to a splitting ratio substantially equal to 33%, values in the range of 30% to 36% may reasonably be understood to be included, and in referring to a phase substantially equal to 60 degrees, values in the range of 57 degrees to 63 degrees may reasonably be assumed to be included.

Figure 1:
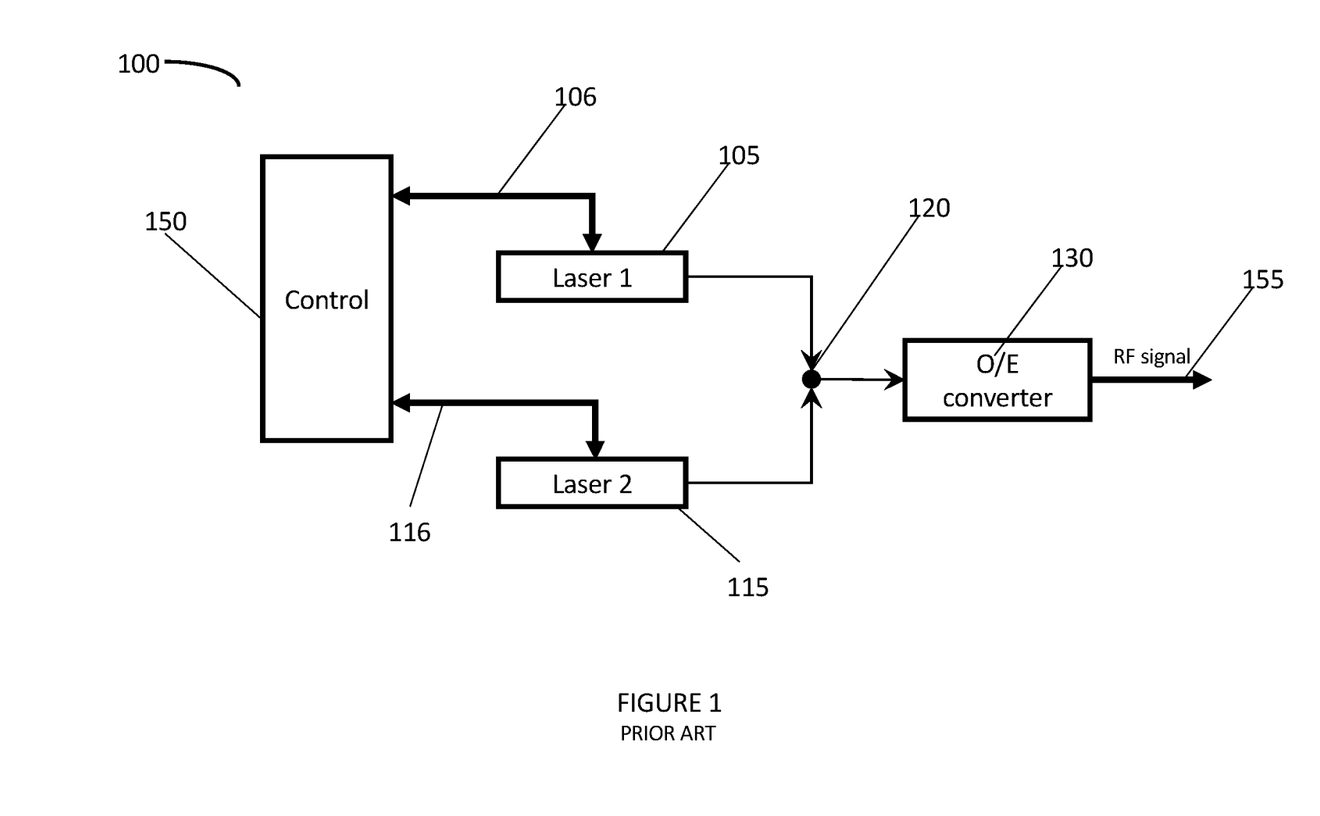
FIG. 1 (Prior Art) illustrates a prior art radio frequency generator.

FIG. 1 illustrates an RF generator 100 typical of prior art, made up of two single-frequency lasers 105 and 115, that are optically coupled at location 120 and are incident on an optical-to-electrical (O/E) converter 130 which can be a photo-mixer, photodetector (e.g. photodiode, phototransistor etc.) or any other type of device capable of producing an RF signal at the output 155, having a frequency equal to the frequency difference of the two incident optical signals. Each single-frequency laser can be any type of laser with sufficient side-mode suppression ratio (SMSR) for the application. Typically, the laser would have SMSR>30 dB, such as a distributed feedback (DFB) laser, distributed Bragg reflector (DBR) laser, external cavity laser, ring-resonator based tunable laser, sampled grating distributed Bragg reflector (SG-DBR) laser and/or others. In some applications, lasers with SMSR<30 dB can be used. The polarization of the lasers is generally controlled to maximize the response of element 130. Both lasers are controlled by element 150 that can be a microprocessor, field-programmable gate array (FPGA) electronic circuit and/or any other type of electronic device capable of controlling the lasers, including by controlling one or more parameters such as drive current, temperature, or any other parameter determining output power, wavelength of operation, polarization, etc. Each laser generally has a set of individual controls, with signals 106 providing control of laser 105, and signals 116 providing control of laser 115 in the shown embodiment. These control signals can be bidirectional, with some signals read by the control unit 150 (e.g. laser temperature) and some signals outputted by the control unit 150 (e.g. laser drive current). As the wavelength of one or both of lasers 105 and 115 is tuned, the output RF signal 155 frequency is changed. In the case of mode-hop free lasers, this frequency change can be continuous over a very broad range, approaching or even exceeding 1 THz. Such wide tuning is very challenging to provide with other methods for generating continuous wave (CW) millimeter wave and THz RF signals.

Figure 2:
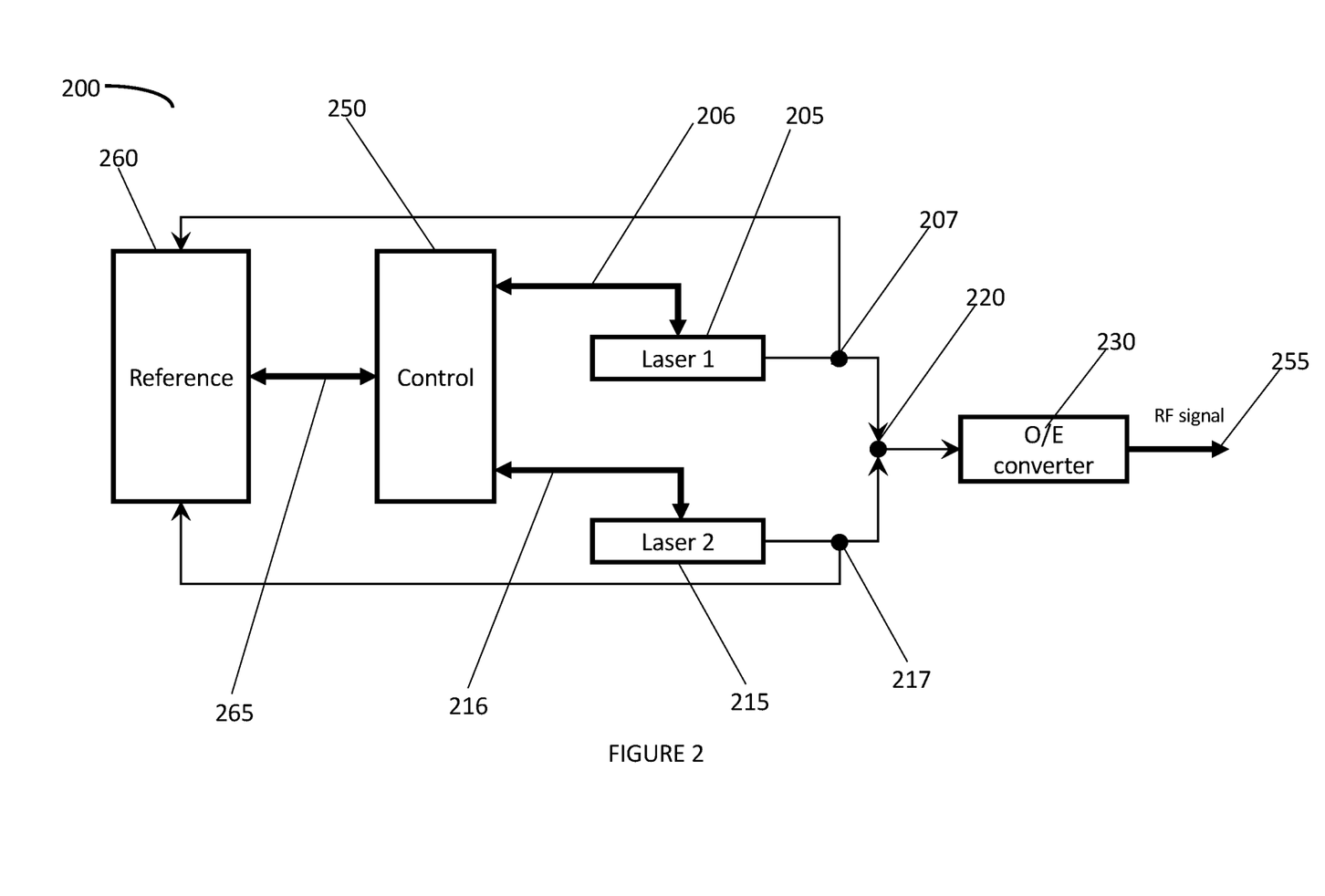
FIG. 2 illustrates a radio frequency generator according to one embodiment of the present invention.

FIG. 2 illustrates an RF generator 200 according to one embodiment of the present invention. One significant difference between this and prior art devices (such as 100 in FIG. 1) is the inclusion of a reference module 260 to be described in detail with the help of FIG. 3. Outputs from two lasers 205 and 215 are optically coupled at location 220 and are incident on O/E converter 230 which can, similarly to the RF generator described with the help of FIG. 1, be a photo-mixer, photodetector (typically a photodiode) or any other type of device capable of producing an RF signal at the output 255, having a frequency equal to the frequency difference of the two incident optical signals. A portion of each laser's outputs is tapped, at element 207 for laser 205, and element 217 for laser 215, and fed into reference module 260. Each element (207, 217) can be any type of structure that splits incident optical power to two or more parts such as, but not limited to, a directional coupler, multi-mode interference (MMI) coupler, thin-film filter, or an adiabatic coupler. In some embodiments the percentage of power tapped off and sent to reference module 260 is between 1% and 50%. In other embodiments it is smaller than 1%. In yet other embodiments (not shown), outputs from secondary laser ports (for example from the opposite ends of the lasers to the location of their primary output ports) are routed to reference module 260, removing the need for tapping elements 207 and 217. Both lasers are controlled by element 250 that can be a microprocessor, field-programmable gate array (FPGA) electronic circuit and/or any other type of electronic device capable of controlling the lasers, including by controlling one or more parameters such as drive current, temperature, or any other parameter determining output power, wavelength of operation, polarization, etc. Each laser generally has a set of individual controls, with signals 206 providing control of laser 205, and signals 216 providing control of laser 215 in the shown embodiment.

The other significant difference between generator 200 and prior art generators such as 100 is the set of signals 265 used to control and monitor signals from reference module 260 using control module 250. These signals are used to precisely monitor and control the wavelength of operation of both lasers accounting for any external influence and/or internal drift of the lasers as will be explained with the help of FIG. 3.

Figure 3:
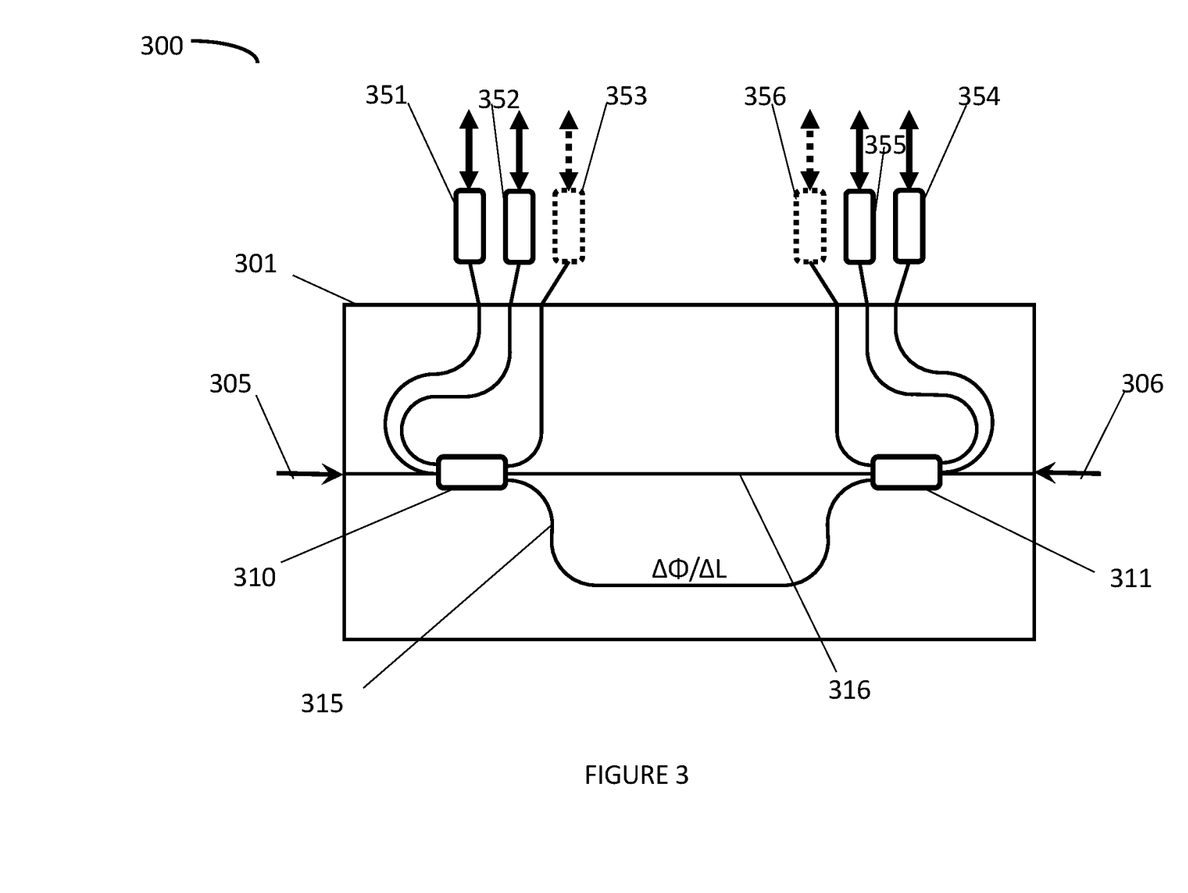
FIG. 3 illustrates one embodiment of a reference module for the radio frequency generator of FIG. 2.

FIG. 3 illustrates a top-down view of one embodiment of reference module 300, corresponding to reference module 260 in FIG. 2. Reference module 300 comprises two optical inputs 305 and 306 that are coupled to a photonic integrated circuit (PIC) element 301. Each of the optical inputs is coupled to one of the lasers (e.g., input 305 is coupled to laser 205 and input 306 is coupled to laser 215). PIC 301 comprises two 3×3 optical couplers/splitters (310 and 311) characterized by splitting input optical power incident to any one of the ports on one side on the splitter to three ports on the other side, with the splitting ratio to each of the "other side" ports exceeding 10% and with optical signal phase difference between any pair of those ports being substantially different than 90°. In some embodiments the splitting ratio to each of the other side ports is substantially equal to ~33%, and the phase difference between those ports (specifically the pair of mixed-use ports feeding into 315 and 316 to be described below) is substantially equal to one of 60°, 120°, 240° and 300°.

A fiber-based 3×3 optical coupler/splitter can be made relatively simply by geometrically placing three fibers at optimized distances and arranging interaction to occur between them over an optimized length, to realize what would be commonly called a directional coupler. However, a corresponding approach is not feasible in a typical PIC platform such as e.g. silicon photonics using silicon or silicon-nitride waveguides, or using other waveguide materials such as lithium-niobate, tantalum-pentoxide or other suitable materials. In such cases, due to the planar nature of the PIC, it is not possible to geometrically align three waveguides to have substantially equal coupling among each other, and the required phase differences substantially different than 0°, 90°, 180°, 360°. Instead, the 3×3 optical couplers/splitters (310 and 311) may be realized in a PIC (such as element 301) as 3×3 multimode interference (MMI) couplers/splitters, that can provide suitable coupling and phase relations.

In one embodiment, in which waveguides are made in silicon-nitride, the thickness of the nitride layer in which waveguides, couplers and other components are realized is between 200 nm and 420 nm. Thicknesses in this range allow for individual component performance to be optimized, as propagation loss is generally reduced with reduced thickness of the waveguide, while the performance of the MMI couplers/splitters (insertion loss) is generally improved with increased thickness of the waveguide/multi-mode region due to better mode imaging at the multi-mode region sidewall.

In another embodiment, the waveguides are made in thin-film lithium-niobate. As the refractive index of lithium-niobate is higher than silicon-nitride, it can support higher performance MMI couplers/splitters with the same or lower thicknesses for the lithium-niobate layer. In this embodiment, the thickness of the lithium-niobate layer is between 150 nm and 420 nm.

Other thicknesses can be used, depending on the refractive index contrast of the chosen PIC material system. In some embodiments, multiple etches are utilized to provide high-performance MMI couplers/splitters (using a full etch) and low-propagation loss (using a shallow etch in which sidewall interaction is reduced). In this way, performance of the reference module can be further optimized.

The two couplers/splitters 310 and 311 are connected to each other via two arms 315 and 316 characterized by an optical path length OPL imbalance ($\Delta\phi$, units of radians) and/or physical path length imbalance ($\Delta L$, units of meters). OPL or optical distance is the product of the geometric/physical length of the path followed by light through a given waveguide, and the effective refractive index of that waveguide. In some embodiments $\Delta L$ (physical path length imbalance) is between 100 µm and 1 cm, in other embodiments $\Delta L$ is between 1 cm and 50 cm, and in yet other embodiments $\Delta L$ is >50 cm. In some embodiments, the physical lengths of the arms can be substantially similar but the optical path lengths may still be significantly different due to different phase and group velocities of optical signals in two arms 315 and 316. The optical path length difference defines the free-spectral range (FSR) of the unbalanced Mach-Zehnder interferometer (UMZI) comprising elements 310, 311, 315 and 316, making it a frequency selective element. The larger the OPL difference is, the smaller the FSR. In some embodiments, the FSR is <100 GHz, in other embodiments the FSR is <10 GHz and in yet other embodiments the FSR is <2 GHz. The smaller the FSR is, the more precise the frequency estimation using the UMZI can be, but general requirements on total noise in the system (including thermal, current, voltage, vibration and/or other types of noise) become more stringent for stable laser locking as will be explained below. The choice of the FSR is an optimization parameter dependent on characteristics of the laser, control module, reference module, on external characteristics (e.g. external temperature range of operation, pressure, etc.), application of the frequency generator and/or others.

Light from the laser coupled to input 305 is routed to element 310 where it is split into three parts, one of which is optionally routed to element 353 capable of conversion of optical signals to electrical signals. Such elements are often photodetectors but depending on the nature of the incident signal can be other types of devices. The electronic signal from 353 can be used to monitor the power level of the laser coupled to input 305 without exhibiting any wavelength dependence due to the UMZI FSR. The two other parts of the laser light reaching 310 are routed via arms 315 and 316 to element 311 where they interfere. The condition of interference depends on the laser signal optical wavelength, phases introduced by elements 310 and 311 and the OPL imbalance between the two arms, resulting in the expected UMZI response in which output power at each arm exhibits wavelength dependence. At least two parts of the interference signal are routed to elements 354 and 355, which convert the optical signals to electrical signals that in turn are connected to a control module (control module 250 in the FIG. 2 embodiment). That control module can receive, capture and process electrical signals, and as the laser operating wavelength is swept, or as it drifts, the control module can count the number of FSR fringes corresponding to the changing laser frequency. As long as the phases of the output signals are not equal to 90°, the precise phase of the incident signal at 305 can be determined and used to precisely track the laser frequency change similarly to the case of coherent optical receivers. This is enabled by the phase difference between output ports inherent to elements 310 and/or 311. Each FSR response of the UMZI corresponds to a full 360° phase change, and precise frequency tracking is possible by unwrapping the phase as laser frequency is swept or drifts.

Light from the other laser coupled to input 306 generates a similar set of responses, utilizing elements 351 and 352 to track the UMZI response, and optionally utilizing element 356 to monitor the power level of the laser coupled to input 306.

Elements 353 and 356 are especially important if laser output power varies due to the nature of the laser tuning, due to external effects (e.g. operating temperature), due to component aging and/or for any other reason. In such cases, the power monitored at elements 353 and 356 is used to calibrate and monitor the phase calculation algorithm that uses outputs from elements 351, 352, 354 and 355.

The signals generated at elements 351, 352, 354 and 355 can not only be used to track the laser frequency changes but can also be used to generate control signals to minimize those changes, keeping the frequency of each laser stable or at a particular frequency offset relative to the other. As the RF signal (see output 255 in the FIG. 2 embodiment) is determined by the frequency difference between the lasers, it is evident that by using the reference module 260, stability of the RF signal can be improved. As both lasers are locked to the same reference module, noise and drift inherent to the reference module is suppressed similarly to rejecting common mode noise. Thermal, vibration and/or other external factors generally cause fiber based UMZI references to exhibit larger drift than PIC based UMZI references, so using the latter type increases the stability of the system. In either case, tracking electronics have to provide sufficient bandwidth and gain, and have sufficiently low noise, to enable improved stability when lasers are locked and/or swept using reference module 300. The use of PIC based UMZI references significantly improves the performance of the system, while also enabling size reduction.

Figure 4:
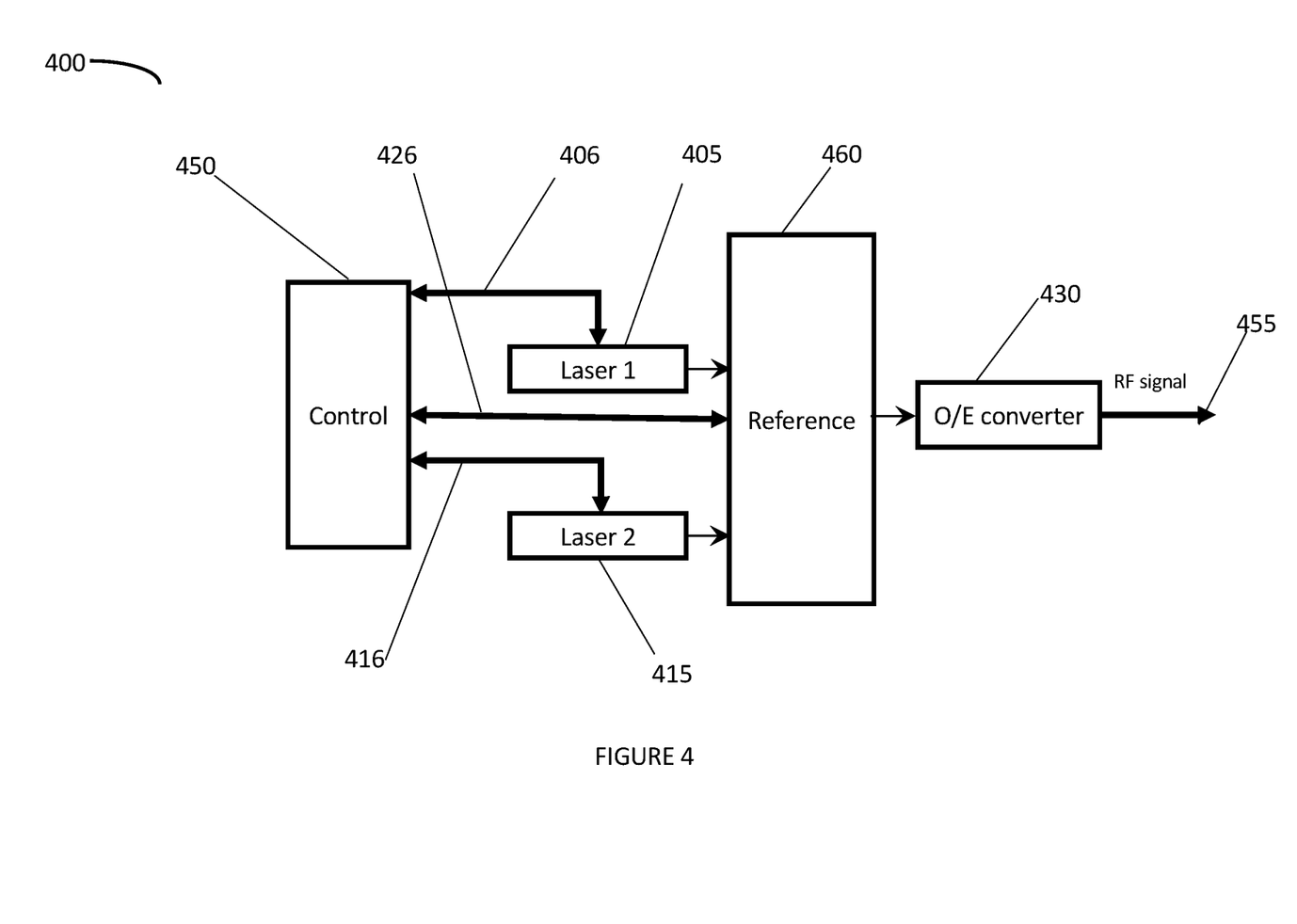
FIG. 4 illustrates a radio frequency generator according to another embodiment of the present invention.

FIG. 4 illustrates an RF generator 400 according to another embodiment of the present invention. Like the embodiment shown in FIG. 2 the lasers are connected to a reference module, missing from prior art generators, but in this case the lasers (405, 411) are directly connected to the reference module (460) removing the need for taps (such as 207, and 217 shown in generator 200), and the reference module (460) is directly connected to the O/E converter (430). In the shown embodiment, O/E converter 460 is connected to lasers 405 and 411 indirectly, via reference module 460, which will described later in detail with the help of FIG. 5. Lasers 405 and 415 and reference module 460 are controlled by control signals 406, 416, and 426 respectively from control module 450 that can be a microprocessor, field-programmable gate array (FPGA) electronic circuit and/or any other type of electronic device capable of controlling the lasers, including by controlling one or more parameters such as drive current, temperature, or any other parameter determining output power, wavelength of operation, polarization, etc.

These control signals (406, 416 and 426) are used to precisely monitor and control the wavelength of operation of both lasers accounting for any external influence and/or internal drift of the lasers.

Figure 5:
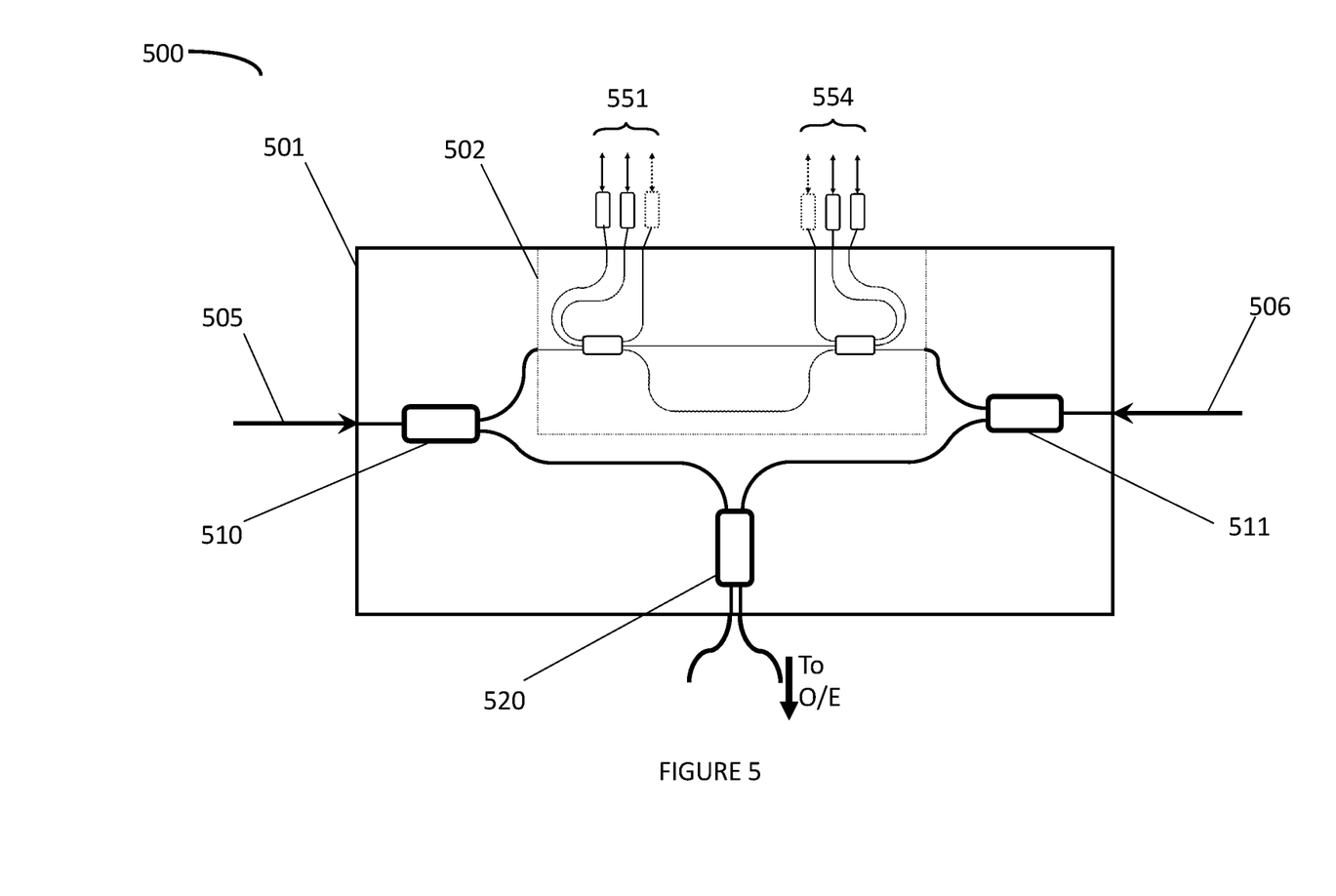
FIG. 5 illustrates one embodiment of a reference module for the radio frequency generator of FIG. 4.

FIG. 5 illustrates a top-down view of one embodiment of reference module 500, corresponding to reference module 460 in FIG. 4. Reference module 500 comprises two optical inputs 505 and 506 that are coupled to a photonic integrated circuit (PIC) element 501. Each of the optical inputs is coupled to a different one of the lasers (e.g., input 505 is coupled to laser 405 and input 506 is coupled to laser 415). PIC 501 provides the full functionality of PIC 301, which is essentially incorporated as PIC sub-section 502, connected to two groups of photodetectors (551 and 554, corresponding to 351-353 and 354-356 in FIG. 3) and adds additional elements 510, 511 and 520 providing an outer "shell" of optical signal splitting and/or combining functionality. Each of these additional elements can be any type of structure that can be realized as a part of a PIC and splits/combines incident optical power to/from two or more parts such as, but not limited to, directional couplers, multi-mode interference (MMI) couplers, adiabatic couplers and/or others.

Optical power from one laser incident at input 505 is split into at least two parts at element 510, with one part being routed to PIC sub-section 502 to provide laser frequency tracking functionality (as described above for reference module 300 of FIG. 3), and the second part being routed to element 520 that combines incident power from element 510 and incident power from element 511 (providing identical functionality as element 511 to the optical power incident at input 506 from the other laser) to one or more output ports, connected in turn to an O/E converter (e.g. 430 in the embodiment of FIG. 4). The splitting ratios of element 510 and 511 are optimization parameters, depending on the input optical powers, losses in the PIC, coupling elements, optimal operating point of the O/E converter and other parameters impacting complete system performance. In some embodiments, the splitting ratio of 510 is substantially equal to 50%, meaning that substantially equal power is going toward PIC sub-section 502 and element 520. In some embodiments, the majority of the incident power (meaning greater than 50%) is routed to element 520 to increase the power incident to O/E converter. In some other embodiments, the majority of the incident power (meaning greater than 50%) is routed to PIC sub-section 502 to improve the performance of the laser monitor and lock. The same considerations apply for the splitting ratio of 511.

Figure 6:
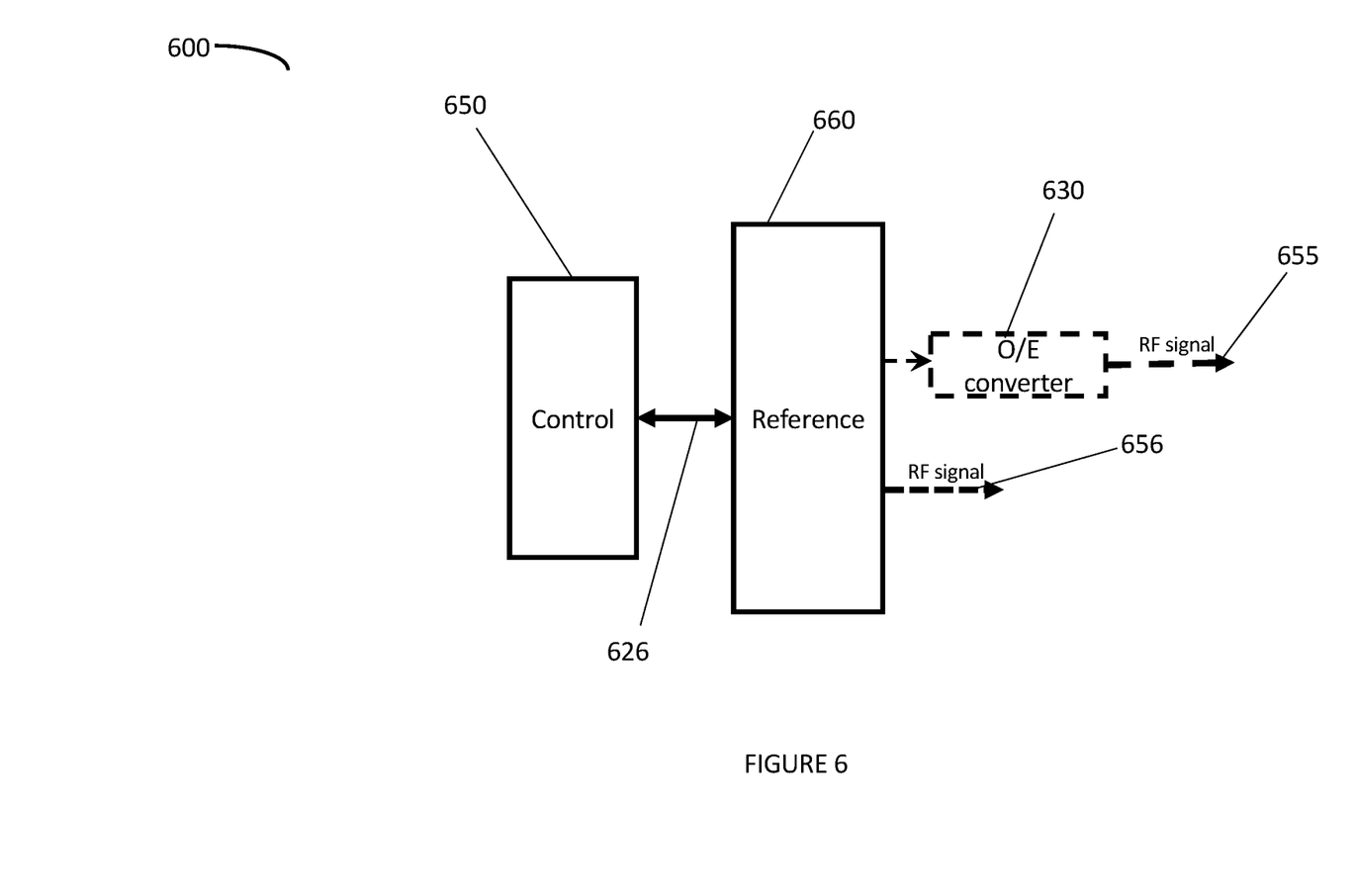
FIG. 6 illustrates a radio frequency generator according to yet another embodiment of the present invention.

In the embodiments shown in FIG. 3 and FIG. 5, some or all of the photodetectors (351-356, 551, 554) could be integrated into a PIC, either the same PIC supporting the UMZI (301, 501) or a separate PIC (not shown). PICs realized using purely silicon-based photonic platforms can incorporate Ge-based photodetectors, but it should be noted that the embodiment of FIG. 7 (to be described below) would require a different material photonic platform, to allow for laser integration, FIG. 6 illustrates an RF generator 600 according to yet another embodiment of the present invention. Like the embodiments shown in FIGS. 2 and 4, a reference module, missing from prior art RF generators, is used, but in this case additional functionality is integrated into the reference module (660) removing the need for external lasers as will be described with the help of FIG. 7. Control module 650, which can be a microprocessor, field-programmable gate array (FPGA) electronic circuit and/or any other type of electronic device capable of providing necessary control signals, is connected to reference module 660 and provides control signals 626 to control its operation. In some cases, reference module 660 includes O/E converter functionality, directly outputting RF signals 656; in others, reference module 660 outputs optical signals to be connected to an external O/E converter 630 to generate output RF signals 655. Both options are shown for completeness, though in practice only one may be present.

Figure 7:
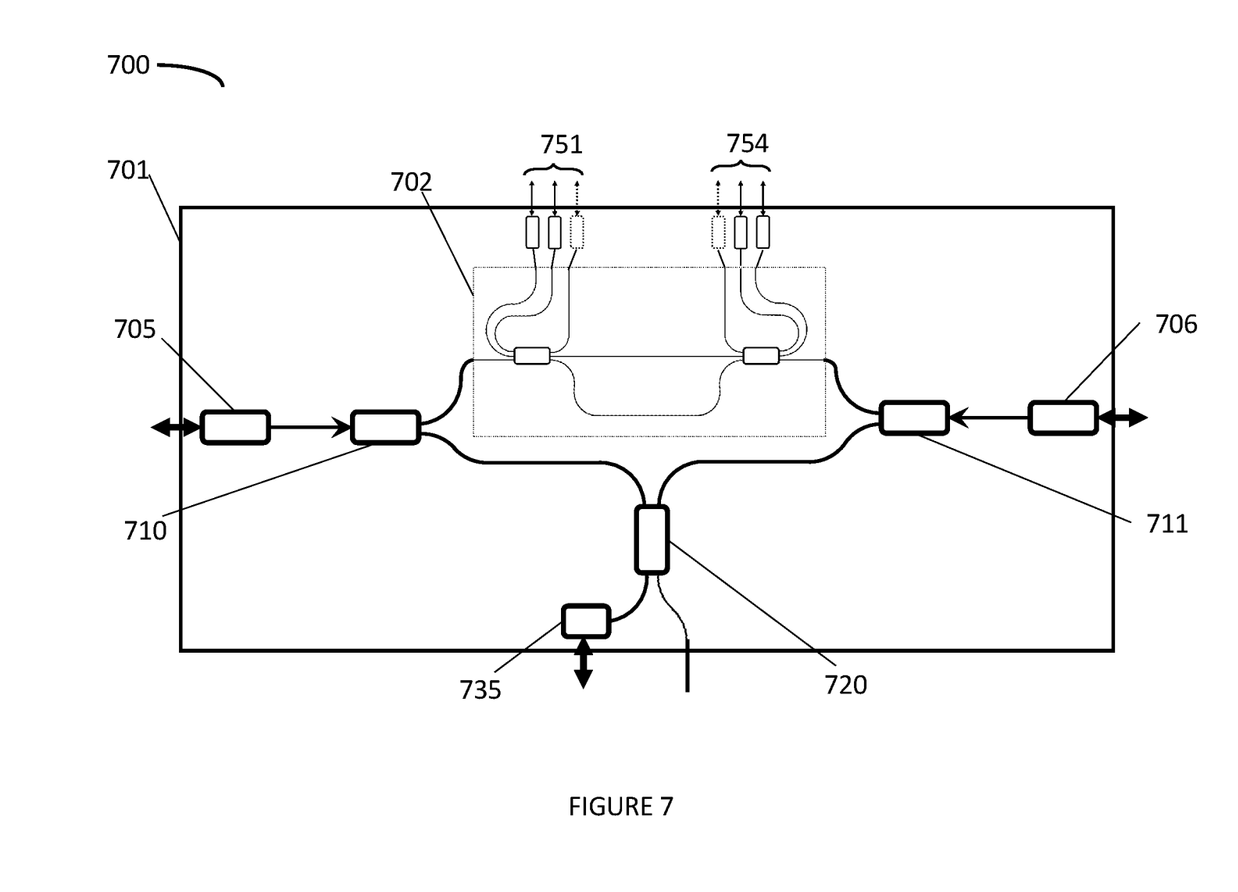
FIG. 7 illustrates one embodiment of a reference module for the radio frequency generator of FIG. 6.

FIG. 7 illustrates a top-down view of one embodiment of reference module 700, corresponding to reference module 660 in FIG. 6. Reference module 700 is shown here realized as PIC 701, providing the full functionality of PIC 301 which is essentially incorporated as PIC sub-section 702, connected to two groups of photodetectors (751 and 754, corresponding to 351-353 and 354-356 in FIG. 3) and two outer shells of additional elements. Each photodetector has an electrical output that can be connected to a control module (e.g. 650 in FIG. 6). A first outer "shell" of elements 710, 711 and 720 provides identical functionality to elements 510, 511 and 520 described above with respect to FIG. 5. PIC 701 further comprises a second outer "shell" with at least two single-frequency lasers 705 and 706 that are optically connected to elements 710 and/or 711 and electrically connected to the generator's control module (e.g. 650 in FIG. 6). In some embodiments, the outputs of element 720 are connected to an additional element 735 having O/E converter functionality and providing RF output signals. In some embodiments, the outputs of element 720 are optically routed off PIC to be connected to an external O/E converter (not shown).

Embodiments of the RF generator described herein may be incorporated into various other devices and systems including, but not limited to, various optical networks, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A radio frequency generator comprising:
  first and second lasers configured to emit first and second optical outputs;
  a reference module configured to receive at least part of the first and second optical outputs from the first and second lasers;
  a control module connected to the first and second lasers and to the reference module; and
  an optical-to-electrical (O/E) converter configured to process optical signals, originating from the first and second single-frequency lasers, to provide a radio frequency output;
  wherein each of the first and second optical outputs is tapped to feed a first fraction, less than 100% of the corresponding optical output, to the reference module, and to feed a second fraction, 100% minus the first fraction, to the O/E converter;

wherein the reference module comprises:

a photonic integrated circuit (PIC) comprising:

an unbalanced Mach-Zehnder interferometer (UMZI) comprising first and second 3×3 splitter/combiners;

wherein the first 3×3 splitter/combiner has an input port receiving the tapped first fraction of the optical output from the first single-frequency laser, two mixed-use ports sending light along a first direction into the UMZI and receiving light back from the UMZI, and two output ports sending light received back from the UMZI to a first pair of photodetectors; and wherein the second 3×3 splitter/combiner has an input port receiving the tapped first fraction of the optical output from the second single-frequency laser, two mixed-use ports sending light into the UMZI along an opposite direction to the first direction and receiving light back from the UMZI, and two output ports sending light received back from the UMZI to a second pair of photodetectors.

2. The radio frequency generator of claim 1,
wherein outputs from the first and second pair of photodetectors are connected to the control module.

3. The radio frequency generator of claim 1,
wherein each of the 3×3 splitter combiners has an optical power monitoring port connected to feed optical power that has not encountered the UMZI to a corresponding monitor photodetector.

4. The radio frequency generator of claim 1,
wherein the UMZI is characterized by a free spectral range (FSR) below 100 GHz.

5. The radio frequency generator of claim 4,
wherein the FSR is below 10 GHz.

6. The radio frequency generator of claim 5,
wherein the FSR is below 2 GHz.

7. The radio frequency generator of claim 1,
wherein the first and second 3×3 splitter/combiners are characterized by splitting ratios exceeding 10% and optical signal phase differences between mixed-use ports substantially different than 90°.

8. The radio frequency generator of claim 7,
wherein the first and second 3×3 splitter/combiners are characterized by splitting ratios substantially equal to 33% and optical signal phase differences between mixed-use ports substantially equal to one of 60°, 120°, 240° and 300°.

9. A radio frequency generator comprising:
first and second lasers configured to emit first and second optical outputs;
a reference module configured to receive at least part of the first and second optical outputs from the first and second lasers;
a control module connected to the first and second lasers and to the reference module; and
an optical-to-electrical (O/E) converter configured to process optical signals, originating from the first and second single-frequency lasers, to provide a radio frequency output;
wherein each of the first and second optical outputs is fed directly into the reference module;
wherein the optical signals received for processing by the O/E converter are provided as an output from the reference module;
wherein the reference module comprises:
a photonic integrated circuit (PIC) comprising:
an unbalanced Mach-Zehnder interferometer (UMZI) comprising first and second 3×3 splitter/combiners;
a first peripheral splitter/combiner receiving the tapped first fraction of the optical output from the first single-frequency laser, providing the first portion of the tapped first fraction of the optical output from the first single-frequency laser to the first 3×3 splitter/combiner, and providing a second portion of the tapped first fraction of the optical output from the first single-frequency laser to an output splitter/combiner; and
a second peripheral splitter/combiner receiving the tapped first fraction of the optical output from the second single-frequency laser, providing the first portion of the tapped first fraction of the optical output from the second single-frequency laser to the second 3×3 splitter/combiner, and providing a second portion of the tapped first fraction of the optical output from the second single-frequency laser to the output splitter/combiner;
wherein the first 3×3 splitter/combiner has an input port receiving a first portion of the tapped first fraction of the optical output from the first single-frequency laser, two mixed-use ports sending light along a first direction into the UMZI and receiving light back from the UMZI, and two output ports sending light received back from the UMZI to a first pair of photodetectors;
wherein the second 3×3 splitter/combiner has an input port receiving a second portion of the tapped first fraction of the optical output from the second single-frequency laser, two mixed ports sending light into the UMZI along an opposite direction to the first direction and receiving light back from the UMZI, and two output ports sending light received back from the UMZI to a second pair of photodetectors; and
wherein the output splitter/combiner is connected to the O/E converter to provide the optical signals processed to provide the radio frequency output.

10. A method of generating a radio frequency signal, the method comprising:
controlling first and second lasers emitting first and second optical outputs at first and second frequencies, such that the difference between first and second frequencies is stabilized; and
mixing the first and second optical outputs at an optical-to-electronic (O/E) converter to provide a radio frequency signal as a generator output;
wherein the stabilization comprises tracking wavelength changes in the first and second outputs using an unbalanced Mach-Zehnder interferometer (UMZI) in a photonic integrated circuit (PIC); and
wherein the controlling comprises estimating optical frequency of the first and second outputs by splitting optical power from each of the first and second outputs, sending portions of the split power into the unbalanced Mach-Zehnder interferometer (UMZI) comprising first and second 3×3 splitter/combiners, and monitoring outputs from the unbalanced UMZI.

11. The method of claim 10,
wherein the UMZI is characterized by a free spectral range (FSR) below 100 GHz.

12. The method of claim 10,
wherein the first and second 3×3 splitter/combiners are characterized by splitting ratios exceeding 10% and optical signal phase differences between mixed-use ports substantially different than 90°.

13. The method of claim 10, wherein the PIC comprising the UMZI further comprises:
   the first and second lasers;
   two peripheral splitter/combiners; and
   an output splitter/combiner.

\* \* \* \* \*